US007376137B2

(12) United States Patent
Sung et al.

(10) Patent No.: US 7,376,137 B2
(45) Date of Patent: May 20, 2008

(54) METHOD AND SYSTEM FOR COMMUNICATION BETWEEN COORDINATOR-BASED WIRELESS NETWORKS

(75) Inventors: Hyun-ah Sung, Seoul (KR); Dae-gyu Bae, Suwon-si (KR); Jin-woo Hong, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 268 days.

(21) Appl. No.: 11/114,000

(22) Filed: Apr. 26, 2005

(65) Prior Publication Data

US 2005/0239456 A1 Oct. 27, 2005

(30) Foreign Application Priority Data

Apr. 26, 2004 (KR) ...................... 10-2004-0028663

(51) Int. Cl.
*H04L 12/28* (2006.01)
*H04L 12/56* (2006.01)

(52) U.S. Cl. ...................... 370/401; 370/236; 370/265; 370/310.2; 370/312; 370/328; 370/349; 370/351; 370/466; 370/469

(58) Field of Classification Search ................ 370/401, 370/310.2, 312, 320, 328, 338, 341, 348, 370/349, 351, 389, 392, 395.21, 395.5, 466, 370/467, 469, 236, 252, 265, 352, 356, 400, 370/395.52, 419, 420, 421, 463; 455/41.2; 709/217, 239
See application file for complete search history.

(56) References Cited

U.S. PATENT DOCUMENTS 5,220,562 A * 6/1993 Takada et al. .............. 370/404

(Continued)

FOREIGN PATENT DOCUMENTS

JP 8-274804 A 10/1996

(Continued)

OTHER PUBLICATIONS

IEEE Standard f802.15.3-2003 (Dec. 31, 2003), Technical Standard Content in IEEE 802.15.3 (WPAN); Part 15.3: Wireless Medium Access Control (MAC) and Physical Layer (PHY) Specifications for High Rate Wireless Personal Area Networks (WPANS).

*Primary Examiner*—Matthew Anderson
*Assistant Examiner*—Shaima Q. Aminzay
(74) *Attorney, Agent, or Firm*—Sughrue Mion, PLLC

(57) ABSTRACT

A method and system for communication between wireless networks connected through a wired network in a coordinator-based wireless network environment are provided. According to the method for communication, a wired/wireless relay device that attempts to associate with an initial coordinator-based wireless network notifies a coordinator of information indicating that it acts as a relay device. The coordinator sends the information to wireless network devices within an appropriate coordinator-based wireless network, and each of the wireless network devices transmits data to be transmitted to a device within a different coordinator-based wireless network to the relay device. When the relay device sends the data to a relay device in a coordinator-based wireless network a destination wireless network device belongs to through a wired network, the relay device in the same coordinator-based wireless network as the destination wireless network device sends the data to the destination wireless network device.

22 Claims, 12 Drawing Sheets

U.S. PATENT DOCUMENTS

| | | | | |
|---|---|---|---|---|
| 6,597,671 | B1 | 7/2003 | Ahmadi et al. | |
| 6,879,574 | B2 * | 4/2005 | Naghian et al. | 370/338 |
| 6,925,064 | B2 * | 8/2005 | Hester et al. | 370/255 |
| 6,925,069 | B2 * | 8/2005 | Koos et al. | 370/334 |
| 7,016,336 | B2 * | 3/2006 | Sorensen | 370/351 |
| 7,126,926 | B1 * | 10/2006 | Bjorklund et al. | 370/328 |
| 2002/0164953 | A1 | 11/2002 | Curtis | |
| 2003/0012219 | A1 | 1/2003 | Joo | |
| 2003/0016636 | A1 * | 1/2003 | Tari et al. | 370/328 |
| 2003/0142643 | A1 * | 7/2003 | Yang et al. | 370/328 |
| 2003/0149794 | A1 | 8/2003 | Morris et al. | |
| 2003/0152059 | A1 * | 8/2003 | Odman | 370/338 |
| 2003/0235175 | A1 * | 12/2003 | Naghian et al. | 370/338 |
| 2004/0081203 | A1 * | 4/2004 | Sodder et al. | 370/469 |
| 2005/0152305 | A1 * | 7/2005 | Ji et al. | 370/328 |
| 2005/0221752 | A1 * | 10/2005 | Jamieson et al. | 455/1 |
| 2006/0080460 | A1 * | 4/2006 | Kobayashi et al. | 709/238 |
| 2006/0176850 | A1 * | 8/2006 | Gan et al. | 370/329 |

FOREIGN PATENT DOCUMENTS

| | | | |
|---|---|---|---|
| JP | 2001-136172 | A | 5/2001 |
| JP | 2002-94516 | A | 3/2002 |
| KR | 2003-0013757 | A | 2/2003 |
| KR | 2003-0035227 | A | 5/2003 |
| WO | WO 02/39484 | A2 | 5/2002 |

* cited by examiner

| Octets: 1 | 3 | 1 | 1 |
|---|---|---|---|
| BRIDGE IDENTIFIER | Vendor OUI | LENGTH | ELEMENT ID |

ASIE FRAME (700)

METHOD AND SYSTEM FOR COMMUNICATION BETWEEN COORDINATOR-BASED WIRELESS NETWORKS

CROSS-REFERENCE TO RELATED APPLICATION

This application claims priority from Korean Patent Application No. 10-2004-0028663 filed on Apr. 26, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to wireless networking, and more particularly, to communication between wireless networks in a coordinator-based wireless environment through connection to a wired network.

2. Description of the Related Art

With the advancement in communication and network technologies, a wired network environment using wired media such as coaxial or optical cables is evolving into a wireless one using wireless signals in various frequency bands. In line with the transition from wired to wireless technology, a computing device that contains a wireless interface module, enables mobility, and perform specific functions by processing various information (hereinafter "a wireless network device") is being developed and wireless technologies that enable effective communication between wireless network devices on a wireless network are emerging.

There are two major architectures of wireless networks: infrastructure and ad-hoc networks.

The infrastructure network contains an access point (AP) 110 as shown in FIG. 1 whereas the ad-hoc network does not require an AP for communication as shown in FIG. 2.

In an infrastructure mode, an AP 110 not only connects a wireless network to a wired network but also provides communication among wireless network devices within a wireless network. Thus, all data traffic in the infrastructure network is relayed through the AP 110.

In an ad-hoc mode, wireless network devices within a single wireless network can directly communicate with one another without using an AP.

Such ad-hoc wireless networks can be further classified into two types based on the presence of a coordinator. In one type of wireless network, which is called a "coordinator-based wireless network", a randomly selected wireless network device acts as a coordinator that assigns time ("channel time") to other wireless network devices within the same wireless network for data transmission, and then the other wireless network devices are allowed to transmit data only at the assigned channel time. As compared to the coordinator-based wireless network, which is called a "coordinator-free wireless network", the other type of wireless network allows all network devices to transmit data at any time desired without using a coordinator.

The coordinator-based wireless network is a single independent coordinator-centered network. When there are multiple coordinator-based wireless networks within a certain area, each network has a unique ID to distinguish itself from others.

Thus, while wireless network devices can transmit data to and/or receive data from other network devices during channel time assigned by the coordinator on a coordinator-based wireless network where they belong, they are not allowed to communicate with wireless network devices belonging to another coordinator-based wireless network.

For example, in a home network system containing three coordinator-based wireless networks as shown in FIG. 3, it is assumed that a wireless network-1 310, a wireless network-2 320, and a wireless network-3 330 are built in a first-floor living room, a second-floor schoolroom, and a first-floor bedroom, respectively.

If a user desires to watch movies stored on a media server 315 in the living room using a portable moving picture player 325 in the schoolroom, then the user cannot watch movies since there is no way to communicate between the wireless network-1 310 and the wireless network-2 320. Thus, to see the movies, the user has to go downstairs to the living room.

This problem may arise due to restriction on range of radio waves, absence of information on another coordinator-based wireless network, and channel time allocation.

Thus, there is a need to construct a new network topology for data transmission and reception between wireless network devices belonging to different coordinator-based wireless networks.

SUMMARY OF THE INVENTION

The present invention provides a method and system for enabling data transmission and reception between wireless network devices belonging to different coordinator-based wireless networks by connecting a plurality of different coordinator-based wireless networks through a wired backbone.

According to an aspect of the present invention, there is provided a method for communication between networks, including: a first relay device within a first coordinator-based wireless network notifying a first coordinator of the first coordinator-based wireless network of its presence; the first coordinator sending information about the first relay device to wireless network devices within the first coordinator-based wireless network; and a first wireless network device that receives the broadcast information sending a data frame carrying data to be transmitted to a second wireless network device belonging to a second coordinator-based wireless network to the first relay device.

According to another aspect of the present invention, there is provided a method for communication between networks, including: a first wireless network device within a first coordinator-based wireless network receiving an information frame carrying information about a relay device within the first coordinator-based wireless network from a first coordinator of the first coordinator-based wireless network; and the first wireless network device sending a data frame containing data to be transmitted to a second wireless network device within a second coordinator-based wireless network to the relay device.

According to still another aspect of the present invention, there is provided a method for communication between networks, including a first relay device within a first coordinator-based wireless network notifying a first coordinator of the first coordinator-based wireless network of its presence, and receiving a data frame carrying data to be transmitted from the first wireless network device to a second wireless network device in a second coordinator-based wireless network from the first wireless network device that receives an information frame containing information about the first relay device from the first coordinator.

According to yet another aspect of the present invention, there is provided a method for communication between networks, including: a second relay device within a second coordinator-based wireless network receiving a frame from a first relay device within a first coordinator-based wireless network; and encapsulating the received frame and transmitting the resulting frame to a second wireless network device within the second coordinator-based wireless network, wherein the received frame is obtained by encapsulating a subframe respectively specifying physical addresses of the first and second wireless network devices as first source and destination addresses, the frame respectively specifying backbone physical addresses of the first and second relay devices as second source and destination addresses.

According to a further aspect of the present invention, there is provided a wireless network device that is a first wireless network device within a first coordinator-based wireless network transmitting data to a second wireless network device within a second coordinator-based wireless network device, the wireless network device comprising: a control unit generating a data frame containing the data to be transmitted; and a transceiving unit transmitting the data frame, wherein the data frame is obtained by encapsulating a subframe respectively specifying physical addresses of the first and second wireless network devices as first source and destination addresses, the data frame respectively specifying logical addresses of the first wireless network device and a relay device within the first coordinator-based wireless network as second source and destination addresses.

According to another aspect of the present invention, there is provided a relay device connecting a wired network to a wireless network, including: a control unit generating an information frame containing information indicating that the relay device acts as a device connecting the wired network to the wireless network to relay data; and a wireless network interface transmitting the information frame to a coordinator of a coordinator-based wireless network the relay device belongs to.

According to another aspect of the present invention, there is provided a relay device within a first coordinator-based wireless network, which connects a wired network to a wireless network, the relay device comprising: a wireless network interface receiving a data frame to be transmitted to a second wireless network device within a second coordinator-based wireless network from a first wireless network device within the first coordinator-based wireless network; a control unit encapsulating the data frame into a frame format supported by the wired network; and a wired network interface transmitting the resulting frame to the wired network, wherein the data frame is obtained by encapsulating a subframe respectively specifying physical addresses of the first and second wireless network devices as first source and destination addresses, the data frame respectively specifying logical addresses of the first wireless network device and the relay device as second source and destination addresses.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
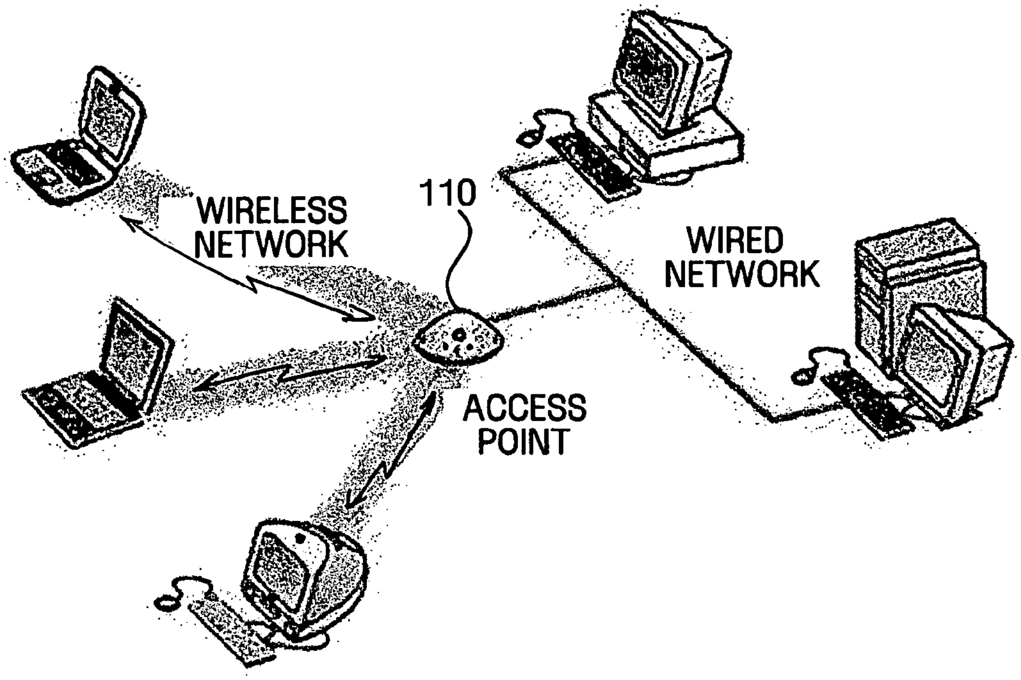
FIG. 1 (PRIOR ART)
FIG. 1 shows a wireless network containing an AP.
Figure 2:
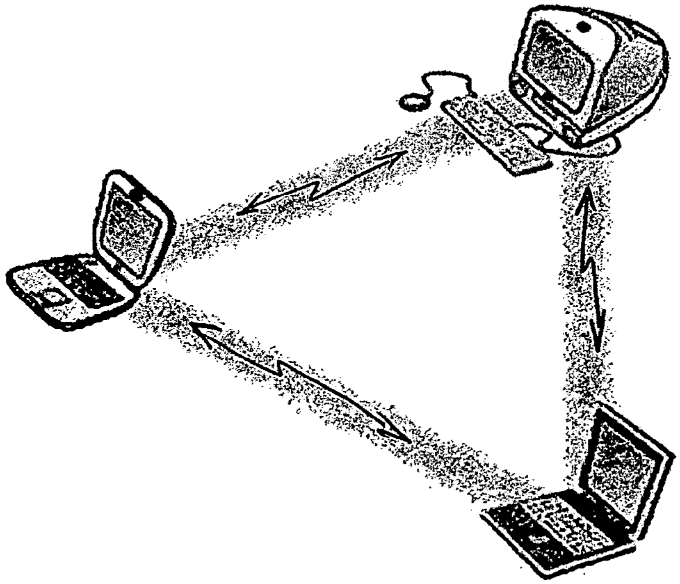
FIG. 2(PRIOR ART)
FIG. 2 shows a wireless network operating in an ad hoc mode.
Figure 3:
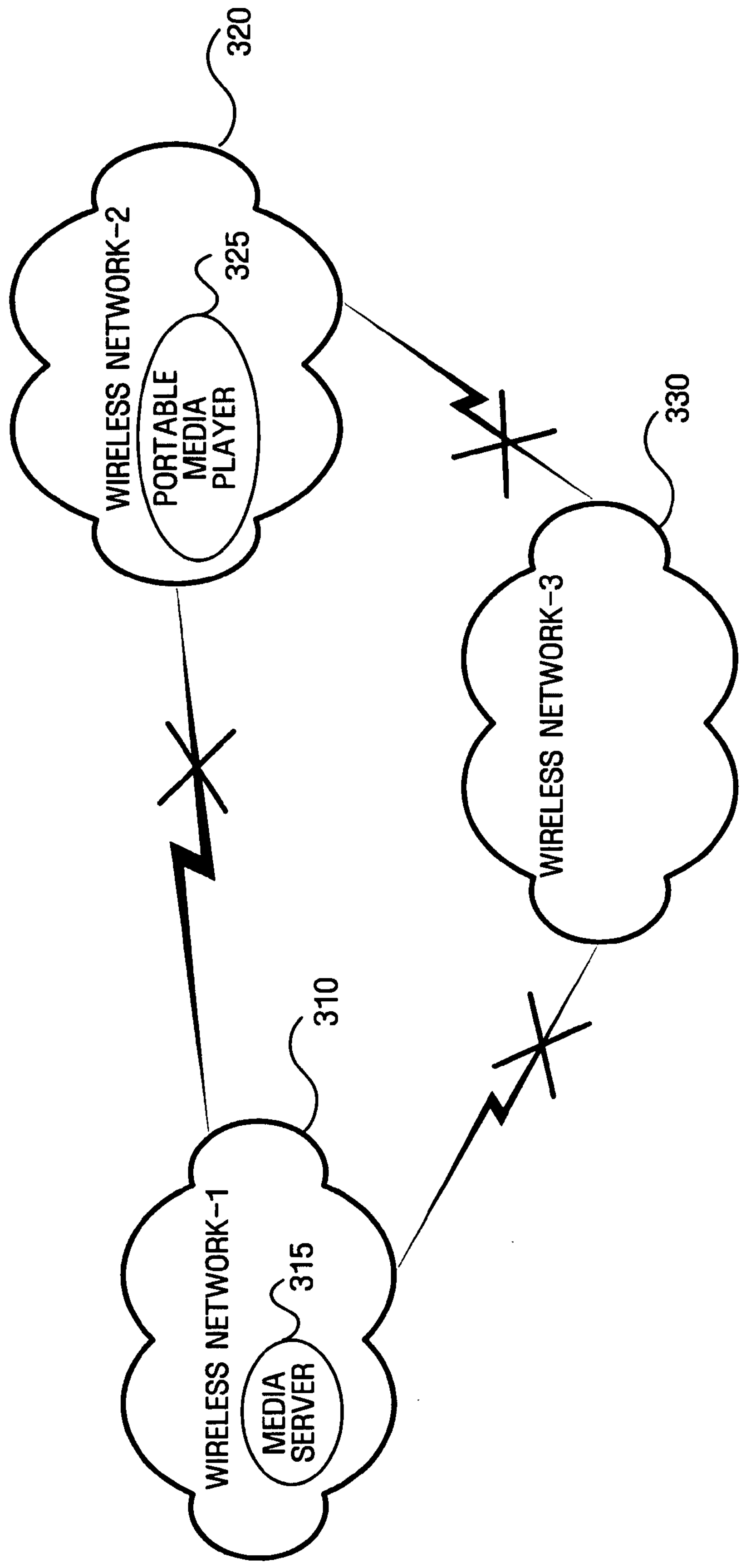
FIG. 3 (PRIOR ART)
FIG. 3 is a schematic diagram of a home networking system containing a plurality of coordinator-based wireless networks.

The present invention will now be described more fully with reference to the accompanying drawings, in which exemplary embodiments of the invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, the present invention will be described with references to block diagrams or flowcharts for explaining a system and method for communication between coordinator-based wireless networks. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Meanwhile, the Institute of Electrical and Electronics Engineers (IEEE) 802.15.3 standard provides specifications for a Physical (PHY) layer corresponding to a Physical Layer of the seven layers of the Open System Interconnection (OSI) network model developed by the International Organization for Standardization (ISO) for wireless networks and a Medium Access Control (MAC) layer corresponding to a Data-link Layer.

To assist in better understanding the present invention, a wireless personal area network (WPAN) compliant with the IEEE 802.15.3 standard, and more particularly, a network system for enabling data communication between wireless network devices belonging to different WPANs by connecting multiple WPANs via a wired backbone at an MAC layer will now be described as an exemplary embodiment of a coordinator-based wireless network.

For consistent use of terms, a wireless network device and a single network created by one or more devices are hereinafter referred to as a “device” and a “piconet”, respectively, as defined in a WPAN.

Meanwhile, prior to describing the exemplary embodiments, the following definitions are provided to clarify terms used herein. A coordinator is randomly selected among network devices within a wireless network and assigns channel time to other wireless network devices within the same network for data transmission. The coordinator may also allocate logical addresses to network devices within the same network that it belongs. The coordinator broadcasts physical addresses and logical addresses of network devices within a coordinator-based wireless network it belongs so that each network device becomes aware of physical/logical address pairs of all other network devices.

A physical address is a hardware address that uniquely identifies each network device on a network and is preset during manufacturing of the device. That is, the physical address of each network device is unique across the entire network.

A logical address is another type of address that uniquely identifies each network device on a network and is assigned by a coordinator. The logical address has a unique value within a coordinator-based wireless network. Thus, when a network device disassociates from a first coordinator-based wireless network and associates with a second coordinator-based wireless network, the network device can be assigned a new logical address, which is unique across the second-coordinator based wireless network, by a coordinator in the second coordinator-based wireless network.

A backbone physical address uniquely identifies a network device connecting to a wired backbone network on the wired backbone network. That is, the backbone physical address is a physical address format used in the wired backbone network.

Figure 4:
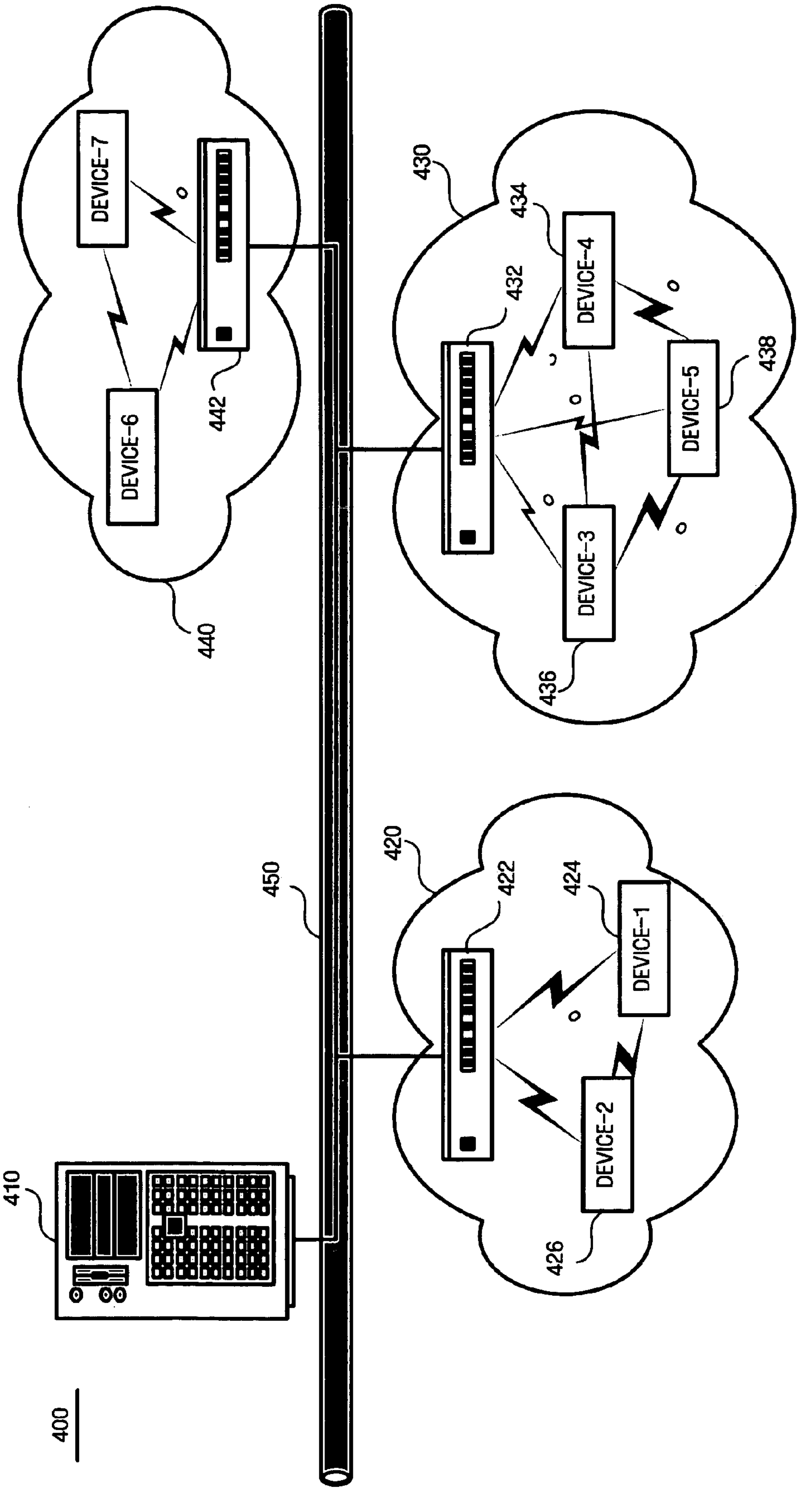
FIG. 4 is a diagram of a network system according to an exemplary embodiment of the present invention.

FIG. 4 is a diagram of a network system according to an exemplary embodiment of the present invention.

Referring to FIG. 4, a network system 400 according to an exemplary embodiment of the present invention includes a plurality of piconets 420, 430, and 440, a wired backbone network 450 connecting with the piconets 420, 430, and 440, and a gateway 410 connecting to the wired backbone network 450. Each of the piconets 420, 430, and 440 respectively includes relay devices 422, 432, and 442 enabling both wired and wireless communications and connecting the first through third piconets 420, 430, and 440 with the wired backbone network 450. And each of the piconets include a plurality of devices (device-1 through device-7) performing wireless communications. In this case, for clear distinction, the piconets 420, 430, and 440 are hereinafter called first, second, and third piconets 420, 460, and 480, respectively.

Further, a device acting as a coordinator may be selected among devices belonging to each of the first through third piconets 420, 430, and 440. In a Wireless Personal Area Network (WPAN), the device is named a “Piconet coordinator” (PNC). The relay devices 422, 432, and 442 as well as the devices (device-1 through device-7) may be elected as a PNC.

To more clearly distinguish between the relay devices 422, 432, and 442, they are hereinafter referred to as first, second, and third relay devices 422, 432, and 442, respectively. Relay device according to an exemplary embodiment of the present invention may be a router, a wired/wireless bridge, a device, or a PNC depending on the type of a network topology and perform a relay function of transmitting data in order to connect a wireless network to a wired network.

The wired backbone network 450 can conform to any wired network protocol based on a communication medium such as coax cable, optical cable, power line, or phone line. For example, Ethernet or token ring may be used as a protocol for the wired backbone network 450. The protocol for the wired backbone network 450 may vary depending on a physical environment where the present invention is applied.

In the present exemplary embodiment, when device-1 424 desires to communicate with device-2 426, i.e., when a communication is made between devices within the same piconet, it may comply with the conventional IEEE 802.15.3 standard.

However, when the device-1 424 belonging to the first piconet 420 wishes to communicate with device-4 434 belonging to the second piconet 430, i.e., when a communication is made between devices belonging to different piconets, it is difficult to implement a communication mechanism only with a frame format compliant with the conventional IEEE 802.15.3 standard. The conventional IEEE 802.15.3 standard supports an 8-byte MAC address as a physical address of a device and converts the 8-byte MAC address into a 1-byte device ID (DevID) which is logical address to reduce an MAC header overhead when generating an MAC frame. A device ID uniquely identifies a device and is assigned by a PNC. However, since a device often cannot recognize device IDs of other devices in different piconets, a communication between devices in different piconets is difficult to perform.

To overcome this problem, the present invention proposes a new frame format containing a newly defined field in addition to the conventional IEEE 802.15.3 frame format. Data transmission between devices in different piconets that is possible through the use of the new frame format will be described later.

Meanwhile, each of the devices, device-1 through device-7, generates a subframe (first frame) containing data to be transmitted and physical addresses of a destination device receiving the data and a source device sending the data. Then, the device generates a second frame encapsulating the first frame. The second frame uses logical addresses to identify a destination device and a source device. In an exemplary embodiment of the present invention, the first frame may be an Ethernet frame format, which is hereinafter called an Ethernet frame. The second frame conforms to a coordinator-based wireless network protocol such as an IEEE 802.15.3 protocol, which is hereinafter called an MAC frame.

In describing the prevent invention, an MAC address and a device ID are used as a physical address and a logical address, respectively.

Figure 5:
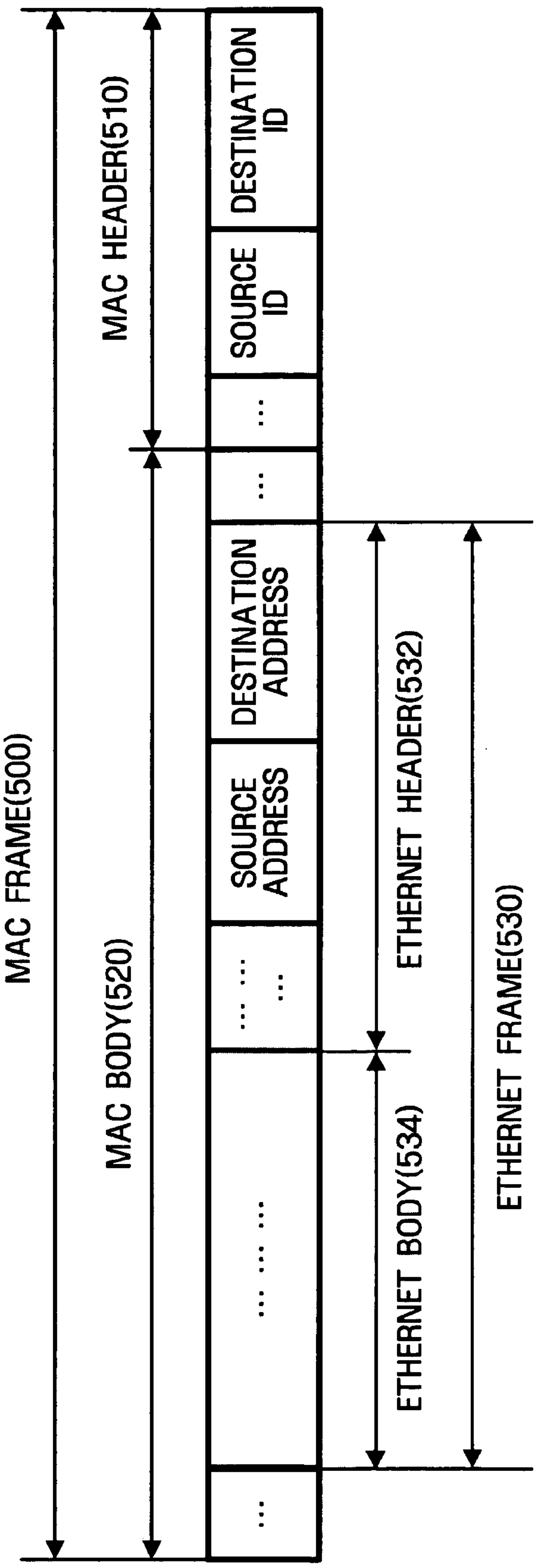
FIG. 5 illustrates the format of a Medium Access Control (MAC) frame encapsulating an Ethernet frame according to an exemplary embodiment of the present invention.

FIG. 5 illustrates the format of an MAC frame 500 encapsulating an Ethernet frame 530 according to an exemplary embodiment of the present invention. For convenience of explanation, only address fields used to identify devices in the MAC frame 500 are shown in FIG. 5.

Each device generates the Ethernet frame 530 to transmit data. The Ethernet frame 530 consists of an Ethernet header 532 and an Ethernet body 534 containing data to be transmitted by the device. The Ethernet header 532 contains a source address field and a destination address field respectively specifying MAC addresses of a source device and a destination device.

The device then encapsulates the Ethernet frame 530 into an MAC frame to perform communication conforming to the IEEE 802.15.3 standard. That is, the Ethernet frame 530 may be contained in the MAC body 520 of the MAC frame 500. The MAC header 510 in the MAC frame 500 encapsulating the Ethernet frame 530 contains a source ID field and a destination ID field respectively specifying device IDs of a source device and a destination device.

For example, if the device-1 424 desires to send data to the device-2 426, the device-1 424 may generate the Ethernet frame 534 composed of the Ethernet body 534 containing data to be transmitted and the Ethernet header 532 containing a destination address field set to an MAC address of the device-2 426 and a source address field set to its own MAC address. Then, the device-1 424 may generate the MAC frame 500 encapsulating the Ethernet frame 534. The MAC header 510 in the MAC frame 500 contains a destination ID field set to the device ID of the device-2 426 and a source ID field set to the device ID of the device-1 424.

Alternatively, the device may create an MAC frame consisting of an MAC body containing data to be transmitted and an MAC header containing both physical and logical addresses identifying a destination device and a source device without generating an Ethernet frame.

Figure 6:
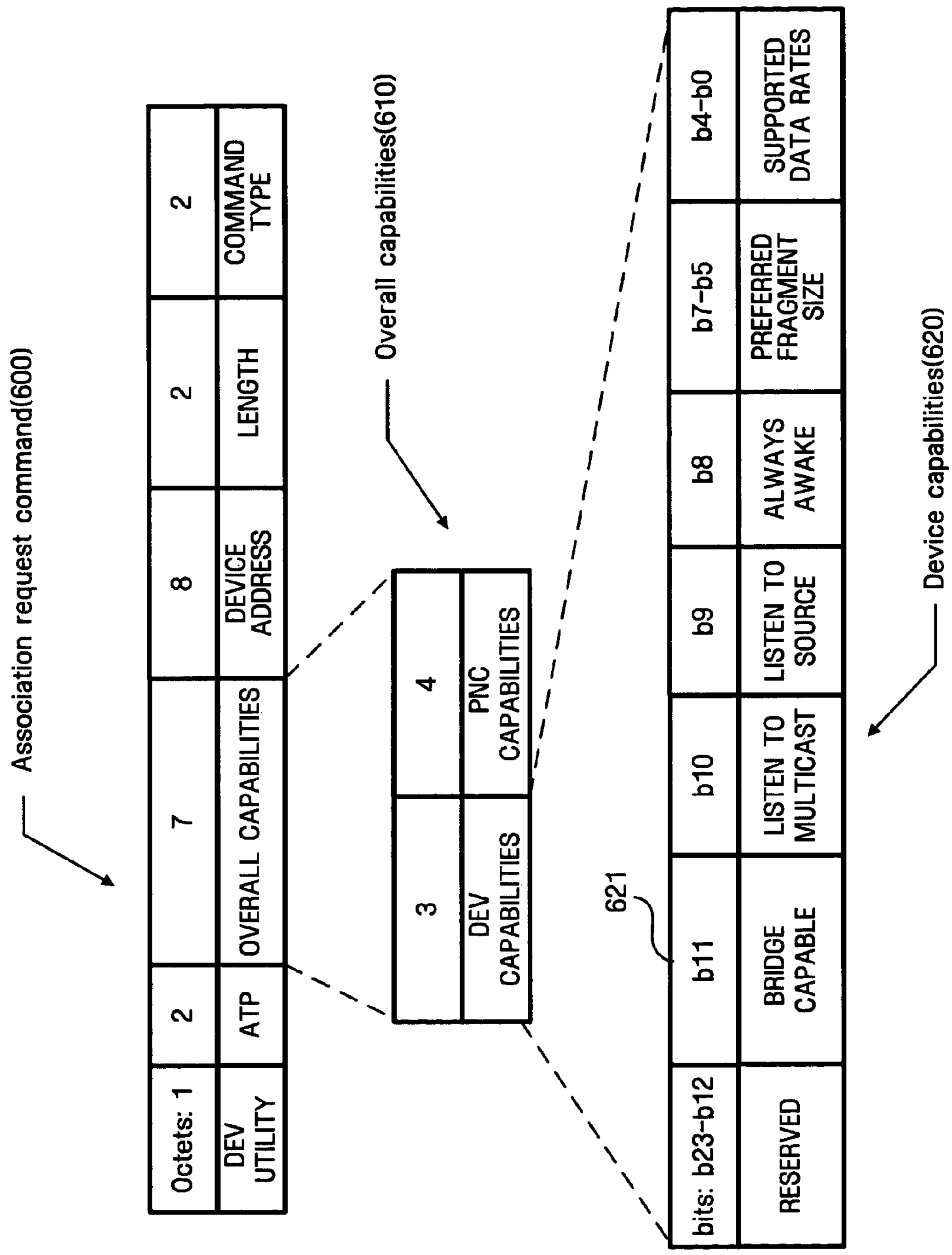
FIG. 6 illustrates the format of an association request command according to an exemplary embodiment of the present invention.

FIG. 6 illustrates the format of an association request command 600 according to an exemplary embodiment of the present invention. The association request command 600 contains a new field in addition to a conventional IEEE 802.15.3 command format. The newly added field specifies the capabilities of a relay device relaying communication between wireless and wired networks. In exemplary embodiments of the present invention, a wired/wireless bridge (hereinafter called a "bridge") is used as the relay device.

In one exemplary embodiment, when a device attempts to associate with a specific piconet, the device sends an association request command 600 containing its own characteristics to a PNC found within an appropriate channel.

An overall capabilities field 610 of the association request command 600 contains a device capabilities field 620 and a PNC capabilities field. Subfields in the device capabilities field 620 specify various capabilities that the appropriate device has. The capabilities include supported data rates, preferred fragment size, always awake, listen to source, and listen to multicast.

In addition to the conventional subfields, the present invention uses 1 bit of a reserved field to define a bridge capable field 621. The bridge capable field 621 may have a value of 0 representing "not capable" or a value of 1 representing "capable". "Not capable" denotes the device is not capable of functioning as a bridge while "capable" denotes the device is capable of functioning as a bridge. When a device functioning as a bridge attempts to associate with a piconet, the device sends the association request command 600 with the bridge capable field set to 1 to a PNC of the piconet. On the other hand, a device not functioning as a bridge sends the association request command 600 with the bridge capable field set to 0 to the PNC.

Alternatively, two or more bits may be used to define the bridge capable field 621. In this case, one bit of the bridge capable field 621 is used to represent "capable" or "not capable" while the remaining bits are used as a reserved field.

Further, a frame proposed by the present invention may be used for another type of a relay device connecting a wired network to a wireless network. In order to apply he proposed frame to another type of a relay device, a specific field may be modified, inserted, or deleted, which will be construed as being included in the present invention.

The PNC that receives the association request command 600 from the device generates an application specific information element (ASIE) frame containing information about the device and broadcasts a beacon containing the ASIE frame to other devices in the appropriate piconet. In particular, upon receiving the association request command 600 from a device functioning as a bridge, the PNC designates a device to function as a bridge within the piconet, generates an ASIE frame containing information about the designated device, and transmits a beacon containing the ASIE frame to other devices in the piconet.

Figures 7, 8:
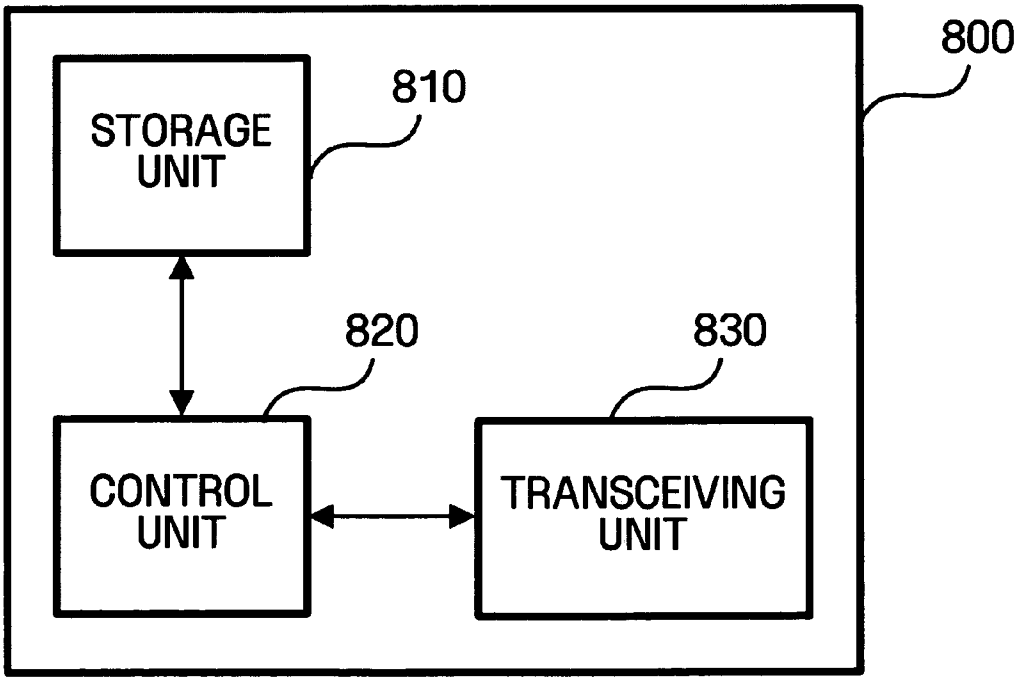
FIG. 7 illustrates the format of an Application-specific Information Element (ASIE) frame according to an exemplary embodiment of the present invention.
FIG. 8 is a block diagram of a device according to an exemplary embodiment of the present invention.

FIG. 7 illustrates the format of an ASIE frame 700 according to an exemplary embodiment of the present invention.

The ASIE frame 700 may conform to a conventional IEEE 802.15.3 format. The ASIE frame 700 includes an element ID field representing an ASIE element ID, a length field representing the length of an ASIE field excluding the element ID field and the length field, a vendor organizationally unique identifier (OUI) field representing a manufacturer of a device acting as a bridge, and a bridge identifier field representing the identifier of a device acting as a bridge. The identifier of the device may be a device ID (DevID) used in the IEEE 802.15.3 standard, and the device ID of the bridge may be allocated by a PNC. While 1 byte is allocated to the bridge identifier field in the present exemplary embodiment, two or more bytes may be allocated.

Meanwhile, when there is an existing bridge in the piconet, the PNC may select either a newly associated bridge or the existing bridge as a bridge to be used in the piconet. The bridge may be selected according to various criteria. For example, it may be selected according to user's option or automatically be selected according to the performance of the bridge. Further, if one of two or more bridges within a piconet is already chosen as a bridge to be used in the piconet, the PNC may subsequently select another bridge as a bridge to be used in the piconet. Each time a new device is selected as a bridge within the piconet, the PNC transmits a beacon containing the ASIE frame 700 carrying information about the bridge to other devices within the piconet.

The devices receiving the ASIE frame 700 can become aware of the presence of a bridge available within the piconet where they belong. When one of the devices desires to transmit data to a device within a different piconet, the device sets a destination ID of an MAC frame to be transmitted to a device ID of the bridge, thereby allowing the bridge to exchange data between devices within different piconets.

FIG. 8 is a block diagram of a device 800 according to an exemplary embodiment of the present invention.

The device 800 includes a storage unit 810 storing identifiers identifying other devices such as MAC addresses and device IDs thereof, a control unit 820 generating an Ethernet frame for transmission of data and encapsulating the Ethernet frame into an MAC frame, and a transceiving unit 830 sending and receiving data.

The storage unit 810 stores MAC addresses, device IDs, and IP addresses of devices within a piconet where the device 800 belongs. The storage unit 810 may also store information about a relay device available within the piconet where the device 800 belongs, such as device ID or MAC address of the relay device extracted from a beacon received from a PNC. When acquiring an IP address and an MAC address of a device within a different piconet, the storage unit 810 may also store them.

Thus, the device 800 is able to identify whether devices belong to the same piconet as it belongs to or a different piconet using information about devices stored in the storage unit 810.

The control unit 820 generates the Ethernet frame for data transmission and encapsulates the same into the MAC frame. The formats of the Ethernet frame and the MAC frame are as shown in FIG. 5. That is, a source address field and a destination address field in an Ethernet header are respectively set to MAC addresses of the device 800 and a destination device. When the Ethernet frame is encapsulated into the MAC frame, a source ID field and a destination ID field in an MAC header are set to device IDs of the device 800 and a destination device, respectively.

If the destination device belongs to a different piconet than the device 800 belongs to, the control unit 820 transmits data to a relay device in the piconet the device 800 belongs to. In this case, the control unit 820 sets a destination address field in the Ethernet frame to an MAC address of the destination device while setting a destination ID field in the MAC frame to a device ID of the relay device.

The device 800 can identify whether the destination device is within a different network than it belongs to using the information about devices stored in the storage unit 810. Further, in an environment supporting IP communication, the control unit 820 may acquire an unknown MAC address of another device using an Address Resolution Protocol (ARP) request. In this case, an ARP request packet may be contained in the Ethernet body (534 of FIG. 5) in the Ethernet frame (530 of FIG. 5).

The device 800 can be aware of the presence of a relay device or acquire a device ID of the relay device using ASIE information contained in a beacon received from a PNC. Upon receiving a beacon containing an ASIE frame indicative of the presence of the relay device, the control unit 820 recognizes a device having the same device ID as in the ASIE frame as the relay device and stores information about the relay device in the storage unit 810. The format of the ASIE frame is as shown in FIG. 7.

The transceiving unit 830 sends a frame generated by the control unit 820 to a transmission medium or receives a frame from another device.

Figure 9:
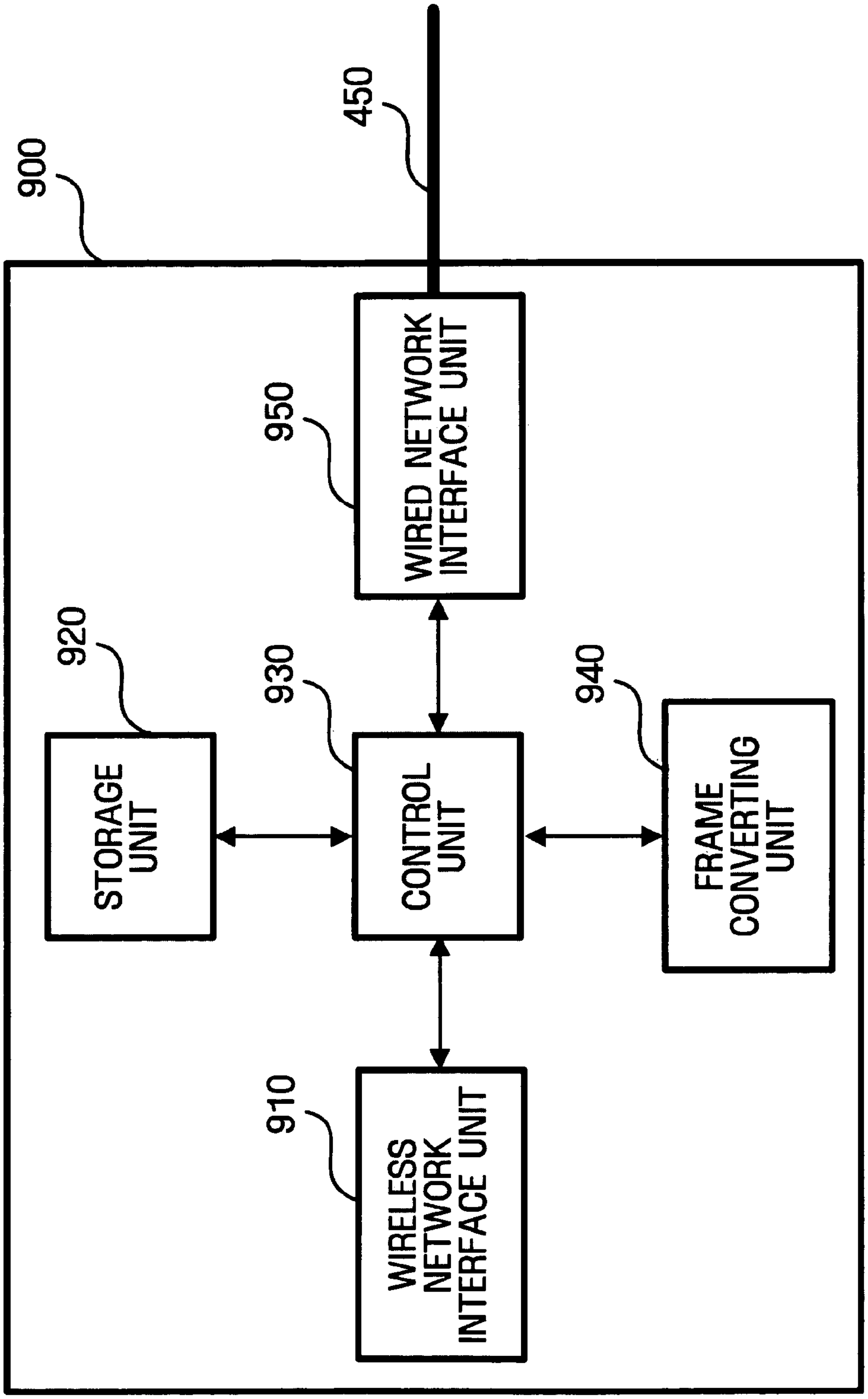
FIG. 9 is a block diagram of a relay device according to an exemplary embodiment of the present invention.

FIG. 9 is a block diagram of a relay device 900 according to an exemplary embodiment of the present invention.

The relay device 900 includes a wireless network interface unit 910 that transmits and receives a wireless frame to and from a piconet, a wired network interface unit 950 that is connected to a wired network 450 and transmits and receives a wired frame, a frame converting unit 940 that converts a wireless frame into a wired frame or vice versa for communication between the piconet and the wired network 450, a storage unit 920 that stores information about devices such as MAC addresses and device IDs of other devices, and a control unit 930 that manages a process occurring among the wireless network interface unit 910, the wired network interface unit 950, the frame converting unit 940, and the storage unit 920. In this case, the frame converting unit 940 and the control unit 930 may be implemented in a single integrated circuit chip, or the function of the frame converting unit 940 may be incorporated into the control unit 930.

The wireless network interface unit 910 and the wired network interface unit 950 can perform communication with the piconet and the wired network 450, respectively. Thus, the relay device 900 may perform wireless communication within the piconet where it belongs as well as wired communication with another piconet connected through the wired network 450 and relay communication between devices within a different piconet.

The storage unit 920 may store information about devices such as MAC addresses, IP addresses, and device IDs thereof. The information stored in the storage unit 920 may be classified into information about devices within the piconet where the relay device 900 belongs and information about devices within a different piconet. In this case, the storage unit 920 may store the information about devices belonging to the same piconet as the relay device 900, separately from the remaining information. Further, the storage unit 920 may also store an MAC address and an IP address of another relay device connecting to the relay device 900 through the wired network 450. In this case, the storage unit 920 classifies MAC addresses of relay devices and devices belonging to the same piconet as each relay device into groups for each relay device, so that the relay device 900 becomes aware of a relay device belonging to the same piconet as each device.

When the relay device 900 receives the MAC frame (500 of FIG. 5) through the wireless network interface unit 910, the control unit 930 decapsulates the received MAC frame to obtain the Ethernet frame (530 of FIG. 5). Then, the control unit 930 checks a destination address field in the Ethernet frame and determines whether the Ethernet frame will be forwarded to the wired network 450. More specifically, the control unit 930 checks whether the destination address field in the Ethernet frame is set to an MAC address of a device belonging to the same piconet as the relay device 900 using information about devices stored in the storage unit 920 and then determines that the Ethernet frame is destined for a device in a different piconet if the destination address field is not set to the MAC address of the device in the same piconet.

When the destination address field in the Ethernet frame is set to an MAC address of a device belonging to a different piconet, the control unit 930 converts a received wireless frame into a wired frame through the convert uniting unit 940. This is because the structure of a communication protocol may vary according to the characteristics of a transmission medium, which may cause a frame format to change. For example, when the wired network 450 is an Ethernet, the wireless frame should be converted into a frame suitable for transmission through the Ethernet. When the wired network 450 is a Token Ring, the wireless frame should be converted into a frame suitable for a Token Ring network.

In order to perform this conversion, the Ethernet frame obtained by decapsulating the received MAC frame may be encapsulated into an MAC frame conforming to a protocol used in the wired network 450 (hereinafter collectively called a "wired backbone frame" in order to distinguish it from an MAC frame conforming to a wireless network protocol).

If the control unit 930 is aware of a specific relay device connecting to the relay device 900 via the wired network 450 and belonging to the same piconet as the device indicated as the destination in a destination address field of the Ethernet frame, it encapsulates the Ethernet frame into the wired backbone frame with a source address field and a destination field set to a backbone physical address of the relay device 900 and a backbone physical address of the specific relay device, respectively through the converting unit 940. The wired backbone frame is then transmitted to the destination relay device. On the other hand, if the control unit 930 is not aware of a relay device belonging to the same piconet as the device indicated as the destination in the destination address field of the Ethernet frame, it broadcasts the wired backbone frame with a destination ID field set to a broadcast address.

When the destination address field of the Ethernet frame is set to the address of another device belonging to the same piconet as the relay device 900, the control unit 930 discards the received wireless frame.

Meanwhile, if the relay device 900 receives a wired backbone frame through the wired network interface unit 950, the control unit 930 decapsulates the wired backbone frame to obtain an Ethernet frame through the converting unit 940. The control unit 930 then determines whether the Ethernet frame is destined for a device belonging to the same piconet as the relay device 900 using the information about devices stored in the storage unit 920.

If the Ethernet frame is destined for the device within the same piconet as the relay device 900, the control unit 930 encapsulates the Ethernet frame into an MAC frame through the frame converting unit 940. Since the control unit 930 cannot be often aware of a device ID of a device indicated as a source in a source address field of the Ethernet frame, it sets a source ID field in the MAC frame to the device ID of the relay device 900 when encapsulating the Ethernet frame. A destination ID field in the MAC frame may be set to a device ID of a device indicated as the destination in a destination address field of the Ethernet frame. On the other hand, if the Ethernet frame is not destined for a device within the same piconet as the relay device 900, the control unit 930 may discard the received wired frame.

The control unit 930 may also transmit an information frame containing information indicating that the relay device 900 acts as a relay device connecting a wired network to a wireless network to a PNC of a piconet where the relay device 900 belongs. The information frame may be the association request frame (600 of FIG. 6) having the format as shown in FIG. 6.

In order to output information received by the wireless network interface unit 910 to the wired network interface unit 950 or to output information received by the wired network interface unit 950 to the wireless network interface unit 910, the frame converting unit 940 converts a wireless frame into a wired backbone frame or vice versa. This is because the structure of a communication protocol may vary according to the characteristics of a transmission medium, which may cause a frame format to change. An example of this conversion is shown in FIG. 10.

Figure 10:
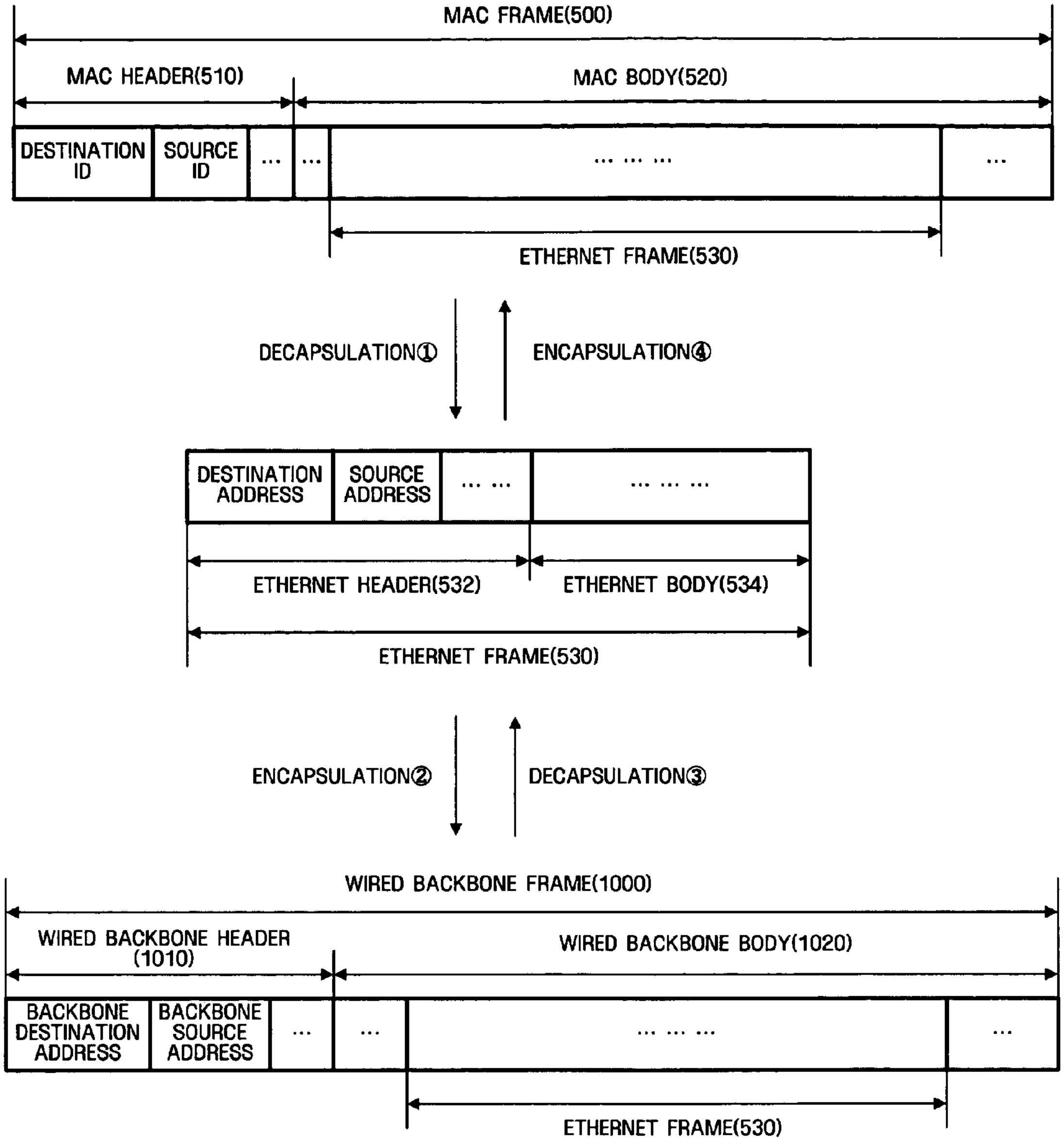
FIG. 10 is a diagram illustrating conversion between an MAC frame and a wired backbone frame according to an exemplary embodiment of the present invention.

Referring to FIG. 10, an MAC header 510 in an MAC frame 500 that is a wireless frame may contain logical addresses of devices sending and receiving the MAC frame. The logical addresses may conform to the structure of a protocol used in a wireless network. The format of the MAC frame 500 is as shown in FIG. 5.

On the other hand, a wired backbone header 1010 may contain backbone physical addresses identifying devices sending and receiving a wired backbone frame 1000. The backbone physical addresses may conform to the structure of a protocol used in a wired network.

Upon receiving the MAC frame 500 from the wireless network interface unit 910, the frame converting unit 940 decapsulates the MAC frame 500 (indicated by arrow ①) and obtains an Ethernet frame 530. When a device indicated as the destination in a destination address field of the Ethernet frame 530 is within a different piconet than the relay device 900 belongs to, the frame converting unit 940 encapsulates the Ethernet frame 530 into the wired backbone frame 1000 (indicated by arrow ②)). In this case, a backbone source address field and a backbone destination address field in the wired backbone frame 1000 are respectively set to a backbone physical address of the relay device 900 and a backbone physical address of a relay device belonging to the same piconet as the device indicated as the destination in the destination address field of the Ethernet frame 530. When the backbone physical address of the relay device belonging to the same piconet as the device indicated as the destination in the destination address field of the Ethernet frame 530 is unknown, the backbone destination address field may be set to a broadcast address.

On the other hand, upon receiving the wired backbone frame 1000 from the wired network interface unit 950, the frame converting unit 940 decapsulates the wired backbone frame 1000 (indicated by arrow ③) and obtains the Ethernet frame 530. When a device indicated in the destination address field of the Ethernet frame 530 is within the same piconet as the relay device 900, the frame converting unit 940 encapsulates the Ethernet frame 530 into the MAC frame 500 (indicated by arrow ④). In this case, a source ID field and a destination ID field in the MAC frame 500 are respectively set to a device ID of the relay device 900 and a device ID of the device indicated in the destination address field of the Ethernet frame 530.

This conversion may be performed by the frame converting unit 940 and controlled by the control unit 930, or be performed by the control unit 930 alone incorporating the function of the frame converting unit 940.

A process for communication between devices within different piconets according to an exemplary embodiment of the present invention will now be described in detail with reference to FIG. 4 and the foregoing description.

According to an exemplary embodiment of the invention, each relay device shown in FIG. 4 is a bridge. To more clearly distinguish between the bridges 422 and 432, they are hereinafter referred to as first and second bridges 422 and 432, respectively.

First, in order for a device or a bridge to associate with a piconet, the device or the bridge sends an association request command to a PNC of the piconet. The format of the association request command is as shown in FIG. 6. The PNC may be a device or a bridge within the piconet.

For convenience of explanation, a PNC of the first piconet 420 is the device-2 426 and a PNC of the second piconet 430 is a device-3 436. In order to distinguish between the PNCs of the first and second piconets 420 and 430, they are hereinafter referred to as first and second PNCs 426 and 436, respectively.

For example, in order for the device-1 424 and the first bridge 422 to associate with the first piconet 420, the device-1 424 and the first bridge 426 send an association request command 600 to the first PNC 426. In this case, the device-1 424 sets a bridge capable field 621 in a device capabilities field 620 of the association request command 600 to 0 while the first bridge 422 sets the bridge capable field 621 to 1.

The first PNC 426 receiving the association request command 600 from the first bridge 422 generates an ASIE frame containing information about the first bridge 422 and transmits a beacon carrying the ASIE frame to devices belonging to the first piconet 420. Because the ASIE frame contains a device ID of the first bridge 422, the devices belonging to the first piconet 420 can be aware of information about the device acting as a bridge within the first piconet 420 through the ASIE frame. The format of the ASIE frame is as shown in FIG. 7.

The association request is made in a similar fashion as in a different piconet, and each device receiving the ASIE frame can become aware of the presence of a device acting as a bridge within a piconet where it belongs and information about the device acting as a bridge.

When the device-1 424 of the first piconet 420 desires to send data to the device-4 434 of the second piconet 430, the device-1 424 generates an Ethernet frame carrying data to be transmitted and encapsulates the Ethernet frame into an MAC frame. The formats of the Ethernet frame and the MAC frame are as described above.

When generating the Ethernet frame, the device-1 424 sets a source address field and a destination address field of the Ethernet frame to its own MAC address and an MAC address of the device-4 434, respectively. When encapsulating the Ethernet frame into the MAC frame, the device-1 424 sets a source ID field of the MAC frame to its own device ID. When not being aware of the device ID of the device-4 434, the device-1 424 sets a destination ID field of the MAC frame to the device ID of the first bridge 422. Upon receiving the beacon carrying the ASIE frame from the first PNC 426, the device-1 424 is able to know the presence of the first bridge 422 and the device ID thereof.

Thus, the MAC frame generated by the device-1 424 is transmitted to the first bridge 422. The first bridge 422 decapsulates the MAC frame received from the device-1 424 to obtain an Ethernet frame and checks whether the destination address field of the Ethernet frame indicates an address of a device within the same piconet as it belongs to. The first bridge 422 may store MAC addresses and device IDs of the devices within the first piconet 420 as well as MAC addresses of devices in a different piconet than the first piconet 420.

Since the destination address field of the Ethernet frame in the MAC frame is set to the MAC address of the device-4 434, the first bridge 422 compares the MAC address of the device-4 434 with information about devices stored in its storage unit and determines that the Ethernet frame is destined for a device within a different piconet.

The first bridge 422 encapsulates the Ethernet frame into a wired backbone frame suitable for a wired backbone network protocol and then forwards the wired backbone frame to the wired network 450. If the first bridge 422 is aware that a device having an MAC address indicated in the destination address field of the Ethernet frame belongs to the same piconet as the second bridge 432, a backbone destination address field of the wired backbone frame is set to a backbone physical address of the second bridge 432. Conversely, if the first bridge 422 is not aware of the fact, it broadcasts the wired backbone frame with the backbone destination address field set to a broadcast address to the wired network 450.

The second bridge 432 decapsulates the wired backbone frame received from the first bridge 422 to obtain an Ethernet frame and checks whether the destination address field of the Ethernet frame is set to an MAC address of a device within the same piconet as it belongs to.

Since the destination address field of the Ethernet frame is set to the MAC address of the device-4 434, the second bridge 432 encapsulates the Ethernet frame into an MAC frame. In this case, a destination ID field of the MAC frame is set to the device ID of the device-4 434. On the other hand, although the source address field of the Ethernet frame is set to the MAC address of the device-1 424, the second bridge 432 may be unaware of the device ID of the device-1 424, or the device-1 424 may have the same device ID as another device within a piconet it belongs. Therefore, the second bridge 432 sets a source ID field of the MAC frame to its own device ID.

Since the device-4 434 receives the MAC frame from the second bridge 432, the device-4 434 decapsulates the MAC frame to obtain an Ethernet frame.

Further, the device-4 434 may perform an inverse process of the above process to transmit a response to the received data to the device-1 424.

Figure 11:
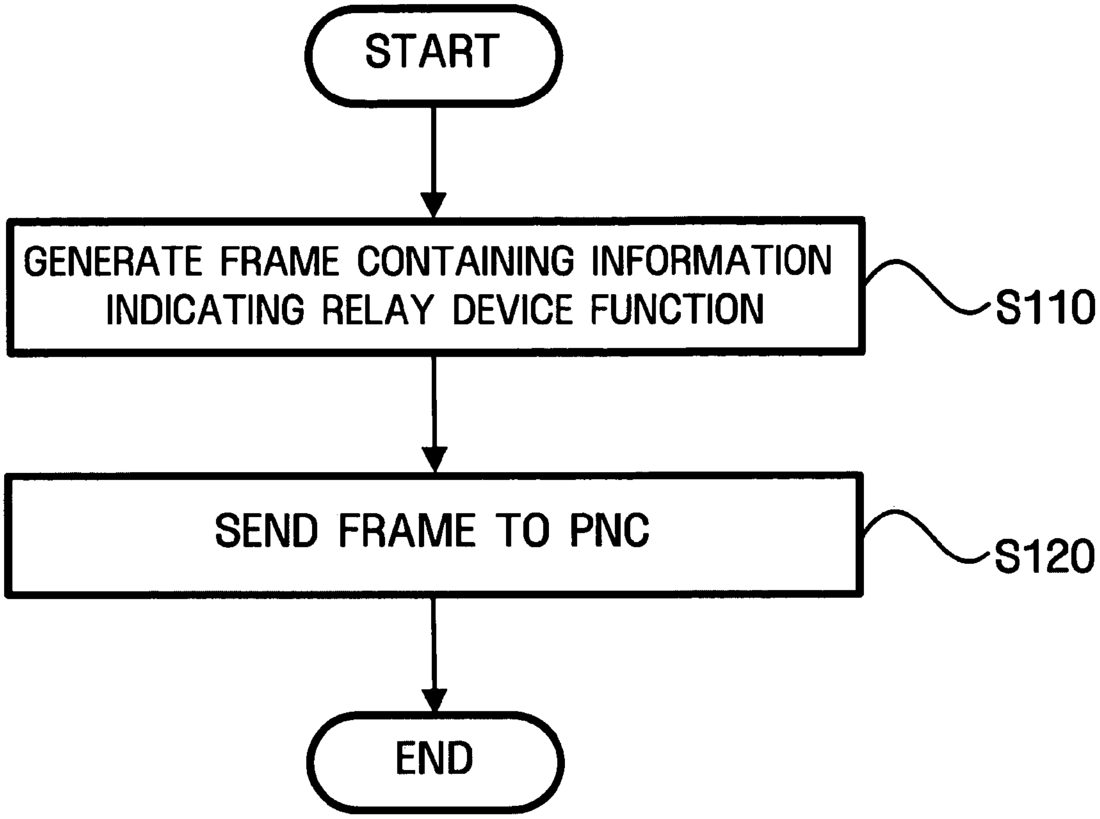
FIG. 11 is a flowchart illustrating a process of sending information about a relay device from the relay device to a coordinator according to an exemplary embodiment of the present invention.

FIG. 11 is a flowchart illustrating a process of sending information about a relay device from the relay device to a PNC according to an exemplary embodiment of the present invention.

Referring to FIG. 11, in operation S110, when an relay device attempts to associate with a piconet, the relay device generates a frame containing information indicating that it acts as a relay device. The frame may be the association request command 600 shown in FIG. 6.

In operation S120, the relay device sends the frame to a PNC of the piconet with which to associate.

Figure 12:
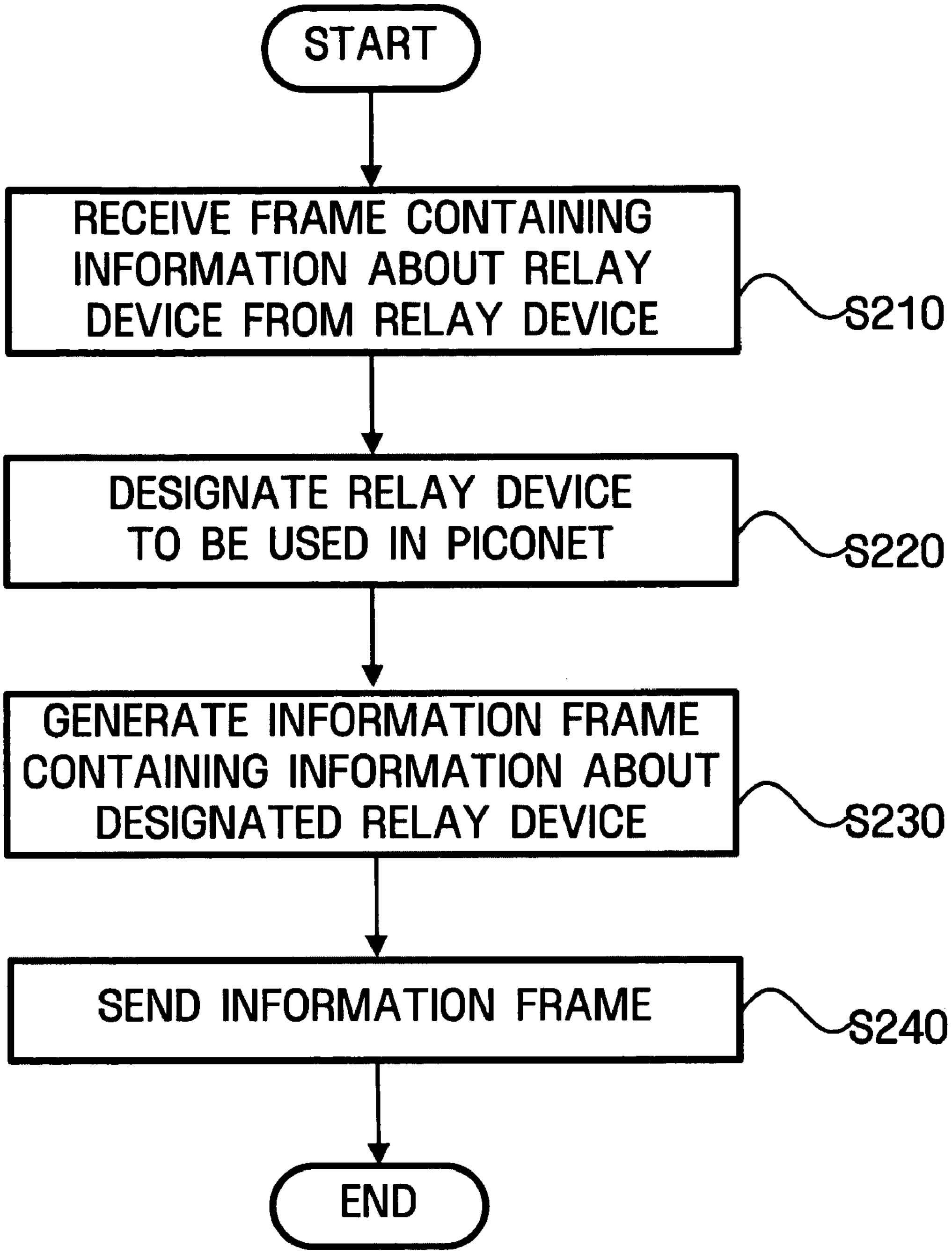
FIG. 12 is a flowchart illustrating a process of sending information about a relay device to be used in a piconet from a coordinator to other devices according to an exemplary embodiment of the present invention.

FIG. 12 is a flowchart illustrating a process of sending information about a relay device to be used in a piconet from a coordinator to other devices according to an exemplary embodiment of the present invention.

Referring to FIG. 12, in operation S210, an PNC receives a frame containing information about a relay device from the relay device. The frame may be the association request command 600 shown in FIG. 6.

In operation S220, the PNC designates a relay device to be used in a piconet it belongs to. The PNC may designate a newly associated relay device as a relay device to be used within the piconet it belongs to. If there is an existing relay device within the piconet, the PNC may redesignate either the newly associated relay device or the existing relay device as a relay device to be used in the piconet. The relay device may be selected according to various criteria. For example, it may be selected according to user's option or automatically be selected according to the performance of the relay device.

Further, if one of two or more relay devices within the piconet is already chosen as a relay device to be used in the piconet, the PNC may subsequently select another relay device.

In operation S230, the PNC designating the relay device to be used in the piconet generates an information frame carrying information about the relay device such as device ID. The information frame may be the ASIE frame 700 shown in FIG. 7. In operation S240, the PNC transmits the information frame to other devices within the piconet.

Figure 13:
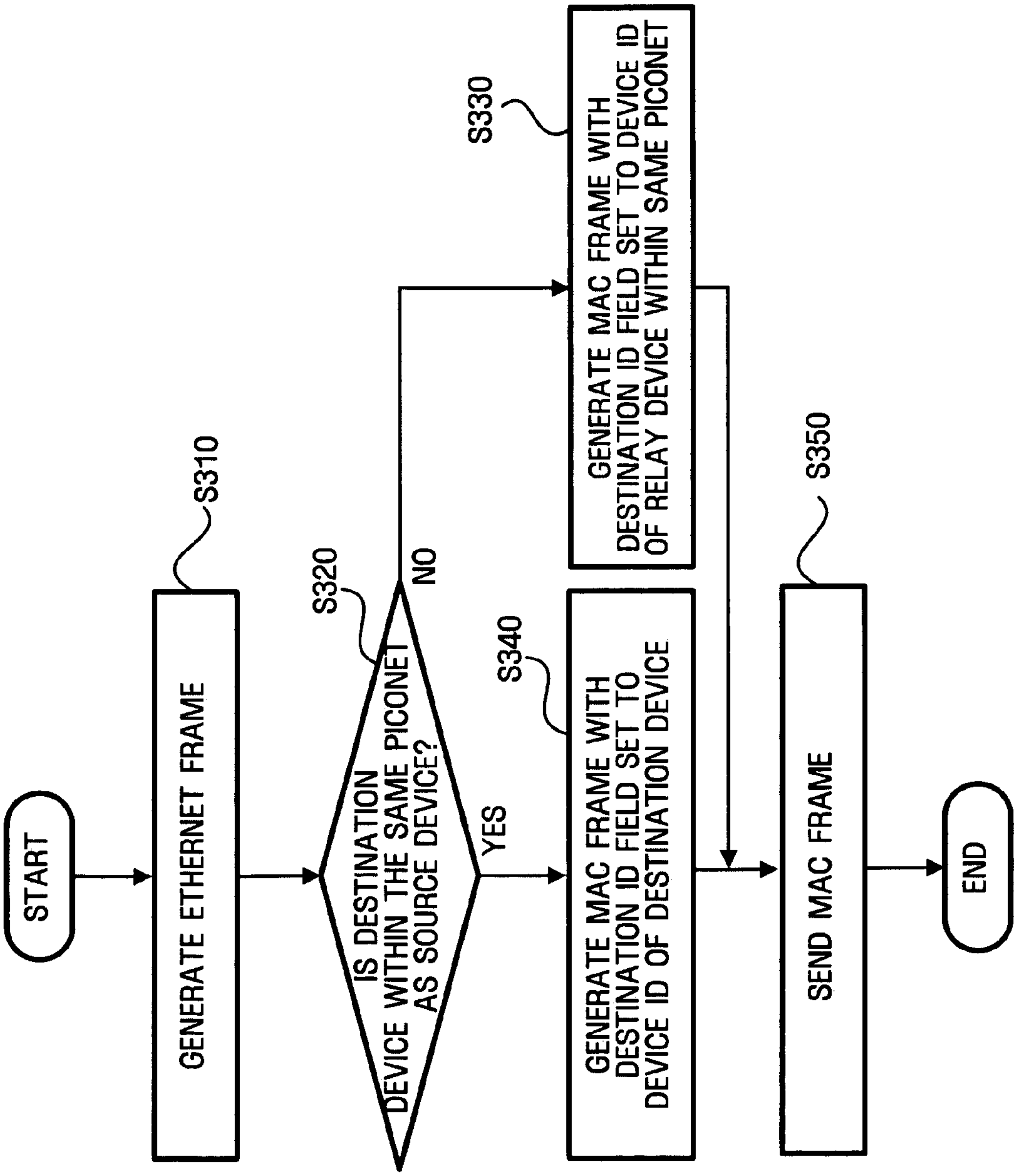
FIG. 13 is a flowchart illustrating a method for performing network communication according to an exemplary embodiment of the present invention.

FIG. 13 is a flowchart illustrating a method for performing network communication according to an exemplary embodiment of the present invention.

Referring to FIG. 13, in operation S310, a source device attempting to transmit data generates an Ethernet frame containing the data. The format of the Ethernet frame is as described above with reference to FIG. 5. That is, a source address field of the Ethernet frame generated by the source device is set to an MAC address of the source device while a destination address field is set to an MAC address of a destination device.

The Ethernet frame is encapsulated into an IEEE 802.15.3 MAC frame because wireless communication between devices according to an exemplary embodiment of the present invention conforms to the IEEE 802.15.3 specification. Thus, when wireless communication is implemented using a different protocol, the Ethernet frame may be encapsulated into an MAC frame supported by a corresponding protocol. The format of the MAC frame is as described above with reference to FIG. 5.

Device IDs of a destination device and a source device are specified in the MAC frame. The source device may be unaware of the device ID of the destination device if the destination device is within a different piconet. Therefore, in operation S320, the source device determines whether the destination device is within the same piconet as it belongs to.

In operation S340, when the destination device is within the same piconet as the source device, the source device searches its storage unit for the device ID of the destination device and generates an MAC frame with a destination ID field set to the found device ID.

On the other hand, in operation S330, when the destination device is within a different piconet than the source device belongs to, the source device generates an MAC frame with the destination ID field set to a device ID of a relay device within the same piconet as it belongs to. As described above, information such as the presence of the relay device and its device ID is obtained from the PNC of the piconet the source device belongs to.

In operation S350, the MAC frame is transmitted through a transceiving unit of the source device. Thus, when attempting to transmit data to a device within a different piconet, a device sends the data to a relay device within a piconet it belongs to, thereby allowing the relay device to relay data between the two piconets.

Figure 14:
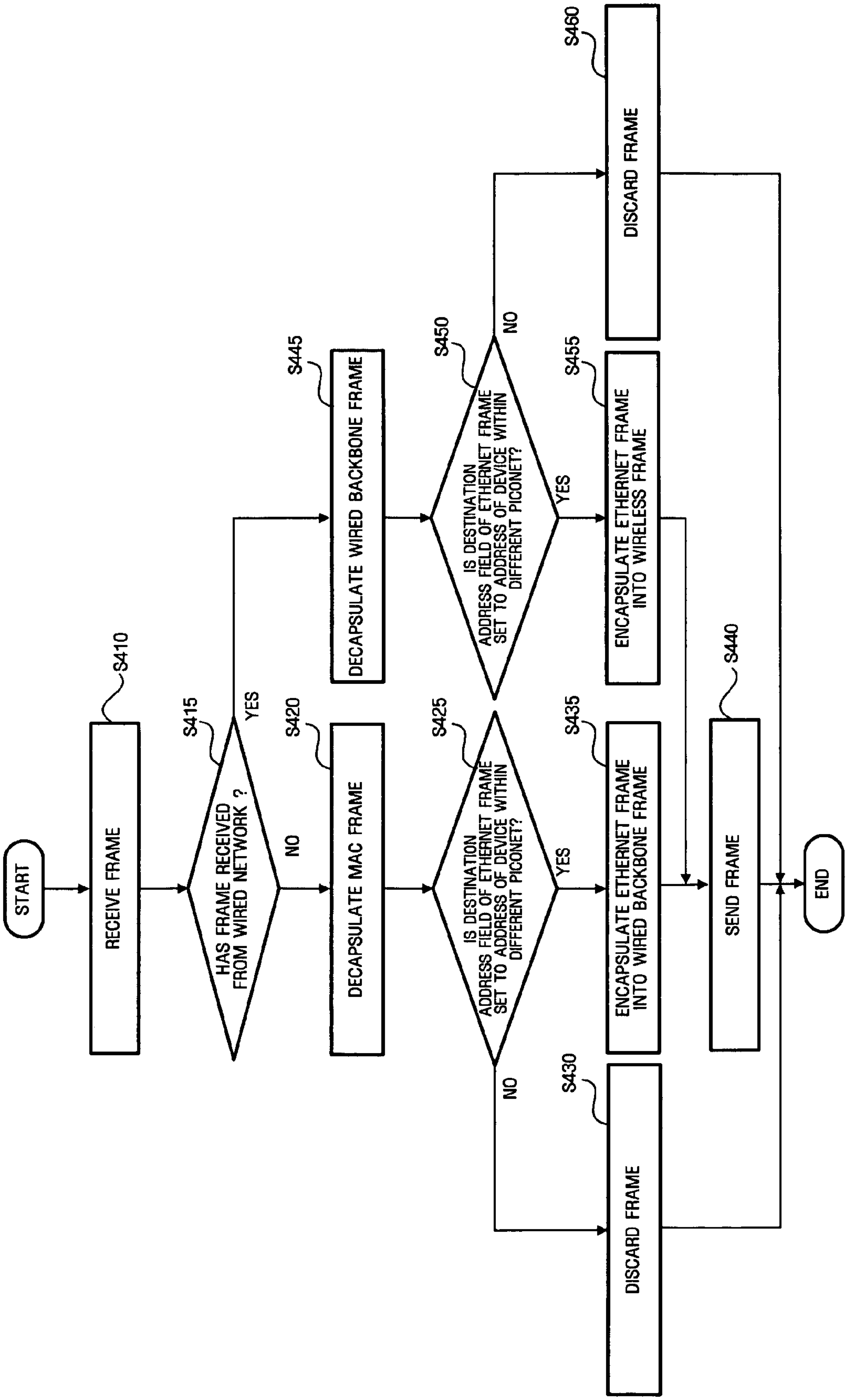
FIG. 14 is a flowchart illustrating a process for communication performed by a relay device according to an exemplary embodiment of the present invention.

FIG. 14 is a flowchart illustrating a process of network communication performed by a relay device according to an exemplary embodiment of the present invention.

An relay device receives a frame in operation S410, and determines whether the frame has been received from a wired network in operation S415. Alternatively, the relay device may determine whether the frame has been received from a wireless network.

When the frame has been received from a wireless network, the frame may be an MAC frame as described above. In operation S420, the relay device decapsulates the MAC frame to obtain an Ethernet frame. In operation S425, the relay device determines whether a destination address field of the Ethernet frame is set to an address of a device within a different piconet than it belongs to using an MAC address specified in the destination address field of the Ethernet frame as described above.

In operation S430, when the Ethernet frame is destined for a device belonging to the same piconet as the relay device, the relay device discards the received frame. When the destination address field indicates the address of the relay device, the relay device obtains data carried in the Ethernet frame.

When the Ethernet frame is destined for a device belonging to a different piconet than the relay device, the relay device encapsulates the Ethernet frame into a wired backbone frame in operation S435 and transmits the wired backbone frame to the wired network in operation S440. The encapsulation of the Ethernet frame into the wired backbone frame is as described above.

In operation S445, when the frame (e.g., the wired backbone frame) has been received from the wired network, the relay device decapsulates the received frame (wired backbone frame) and obtains an Ethernet frame. In operation S450, the relay device determines whether the Ethernet frame is destined for a device within the same piconet as it belongs to as described above.

In operation S455, when the Ethernet frame is destined for the device belonging to the same piconet as the relay device, the relay device encapsulates the Ethernet frame into an MAC frame as described above. In operation S440, the relay device transmits the MAC frame to the destination device.

Conversely, in operation S460, when the Ethernet frame is not destined for the device belonging to the same piconet, the relay device discards the received frame.

A frame to be transmitted or received between devices, between a device and a relay device, or between relay devices may be converted into a packet for transmission or reception.

A system and method for communication between networks according to exemplary embodiments of the present invention enable mutual communication between devices belonging to different wireless networks connected through a wired backbone network.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A method for communication between networks, the method comprising:

notifying a first coordinator of a first coordinator-based wireless network of a presence of a first relay device within the first coordinator-based wireless network;

sending information about the first relay device from the first coordinator to wireless network devices within the first coordinator-based wireless network; and sending a data frame carrying data to be transmitted to a second wireless network device belonging to a second coordinator-based wireless network from a first wireless network device that receives the information about the first relay device, wherein the data frame is obtained by performing first encapsulation on a subframe specifying a physical address of the first wireless network device and a physical address of the second wireless network device as a first source address and a first destination address, respectively, the data frame specifying a logical address of the first wireless network device and a logical address of the first relay device as a second source address and a second destination address, respectively.

2. The method of claim 1, wherein the notifying the first coordinator of the presence of the first relay device comprises:

generating, at the first relay device, an information frame containing information indicating that the first relay device acts as a relay device; and sending the information frame from the first relay device to the first coordinator.

3. The method of claim 1, wherein the notifying of the first coordinator of the presence of the first relay device comprises:

designating, at the first coordinator, a relay device to be used in the first coordinator-based wireless network;

generating an information frame containing a device ID of the relay device designated to be used in the first coordinator-based wireless network; and broadcasting the information frame to the wireless network devices.

4. The method of claim 1, wherein the physical address of the second wireless network device is obtained using an address resolution protocol (ARP).

5. The method of claim 1, further comprising performing, at the first relay device, second encapsulation on the data frame and sending a frame obtained by performing second encapsulation from the first relay device to a second relay device of the second coordinator-based wireless network through a wired backbone network.

6. The method of claim 5, wherein the frame obtained by performing the second encapsulation is obtained by performing first decapsulation on the data frame and generating a frame specifying a backbone physical address of the first relay device and a backbone physical address of the second relay device as a third source address and a third destination address, respectively.

7. The method of claim 6, further comprising performing, at the second relay device, third encapsulation on the frame obtained by performing the second encapsulation and transmitting a frame obtained by performing the third encapsulation to the second wireless network device.

8. The method of claim 7, wherein the frame obtained by performing the third encapsulation is obtained by performing second decapsulation on the frame obtained by performing the second encapsulation and generating a frame specifying a logical address of the second relay device and a logical address of the second wireless network device as a fourth source address and a fourth destination address, respectively.

9. The method of claim 7, further comprising performing, at the second wireless network device, third decapsulation on the frame obtained by performing the third encapsulation and generating the subframe.

10. A method for communication between networks, comprising:

receiving, at a first wireless network device within a first coordinator-based wireless network, an information frame carrying information about a relay device within the first coordinator-based wireless network from a first coordinator of the first coordinator-based wireless network; and sending a data frame containing data to be transmitted from the first wireless network device to a second wireless network device within a second coordinator-based wireless network to the relay device, wherein the data frame is obtained by performing first encapsulation on a subframe specifying a physical address of the first wireless network device and a physical address of the second wireless network device as a first source address and a first destination address, respectively, the data frame specifying a logical address of the first wireless network device and a logical address of the relay device as a second source address and a second destination address, respectively.

11. The method of claim 10, wherein the physical address of the second wireless network device is obtained using an address resolution protocol (ARP).

12. A method for communication between networks, the method comprising:

notifying a first coordinator of a first coordinator-based wireless network of a presence a first relay device within the first coordinator-based wireless network; and receiving a data frame carrying data to be transmitted from the first wireless network device to a second wireless network device in a second coordinator-based wireless network from the first wireless network device that receives an information frame containing information about the first relay device from the first coordinator, wherein the data frame is obtained by performing first encapsulation on a subframe specifying a physical address of the first wireless network device and a physical address of the second wireless network device as first source address and first destination address, respectively, the data frame specifying a logical address of the first wireless network device and a logical address of the first relay device as a second source address and a second destination address, respectively.

13. The method of claim 12, further comprising performing, at the first relay device, second encapsulation on the data frame and sending a frame obtained by performing the second encapsulation from the first relay device to a second relay device of the second coordinator-based wireless network through a wired backbone network.

14. The method of claim 13, wherein the frame obtained by performing the second encapsulation is obtained by performing first decapsulation on the data frame and generating a frame specifying a backbone physical address of the first relay device and a backbone physical address of the second relay device as a third source address and a third destination address, respectively.

15. A method for communication between networks, comprising:

receiving, at a second relay device within a second coordinator-based wireless network, a frame from a first relay device within a first coordinator-based wireless network; and encapsulating the frame received at the second relay device and transmitting a resulting frame to a second wireless network device within the second coordinator-based wireless network, wherein the frame received at the second relay device is obtained by encapsulating a subframe specifying a physical address of the first wireless network device and a physical address of the second wireless network device as a first source address and a first destination address, respectively, the frame specifying a backbone physical address of the first relay device and a backbone physical address of the second relay device as a second source address and a second destination address, respectively, wherein the encapsulating the frame comprises decapsulating the frame and encapsulating a resulting frame specifying a logical address of the second relay device and a logical address of the second wireless network device as third source address and third destination address, respectively.

16. A wireless network device within a first coordinator-based wireless network transmitting data to another wireless network device within a second coordinator-based wireless network device, the wireless network device comprising:

a control unit which generates a data frame containing the data to be transmitted; and a transceiving unit which transmits the data frame, wherein the data frame is obtained by encapsulating a subframe specifying a physical address of the wireless network device and a physical address of the other wireless network device of the second coordinator-based wireless network device as a first source address and a first destination address, respectively, the data frame specifying a logical address of the wireless network device and a logical address of a relay device within the first coordinator-based wireless network as a second source address and a second destination address, respectively.

17. The wireless network device of claim 16, wherein the physical address of the other wireless network device is obtained using an address resolution protocol (ARP).

18. A relay device within a first coordinator-based wireless network, which connects a wired network to a wireless network, the relay device comprising:

a wireless network interface unit which receives a data frame to be transmitted to a second wireless network device within a second coordinator-based wireless network from a first wireless network device within the first coordinator-based wireless network;

a control unit which encapsulates the data frame into a frame format supported by the wired network; and a wired network interface unit which transmits the data frame encapsulated by the control unit to the wired network, wherein the data frame is obtained by encapsulating a subframe specifying a physical address of the first wireless network device and a physical address of the second wireless network device as a first source address and a first destination address, respectively, the data frame specifying a logical address of the first wireless network device and a logical address of the relay device as a second source address and a second destination address, respectively, wherein the control unit encapsulates the data frame by decapsulating the data frame and encapsulating a resulting frame specifying a backbone physical address of the relay device within the first coordinator-based wireless network and a backbone physical address of the relay device of the second wireless network devices as a third source address and a third destination address, respectively.

19. The relay device of claim 18, wherein the control unit generates an information frame containing information indicating that the relay device acts as a device connecting the wired network to the wireless network to relay data, and the wireless network interface unit transmits the information frame to a coordinator of the first coordinator-based wireless network.

20. The relay device of claim 18, wherein the information frame is contained in an association request command generated for association with the coordinator-based wireless network.

21. The relay device of claim 20, wherein the association request command conforms to the IEEE 802.15.3 standard.

22. A relay device within a second coordinator-based wireless network, which connects a wired network to a wireless network, the relay device comprising:

a wired network interface unit which receives a data frame to be transmitted to a second wireless network device within the second coordinator-based wireless network from a first wireless network device within a first coordinator-based wireless network;

a control unit which encapsulates the data frame into a frame format supported by the second coordinator-based wireless network; and a wireless network interface unit which transmits the data frame encapsulated by the control unit to the second wireless network device, wherein the data frame is obtained by encapsulating a subframe specifying a physical address of the first wireless network device and a physical address of the second wireless network device as a first source address and a first destination address, respectively, the data frame specifying a backbone physical address of a relay device within the first coordinator-based wireless network and a backbone physical address of a relay device within the second coordinator-based wireless network as a second source address and a second destination address, respectively, wherein the control unit encapsulates the data frame by decapsulating the received frame and encapsulating a resulting frame specifying a physical address of the relay device within the second coordinator-based wireless network and a physical address of the second wireless network device as a third source address and a third destination address, respectively.

* * * * *